United States Patent [19]

Lanzisera et al.

[11] Patent Number: 4,650,276

[45] Date of Patent: Mar. 17, 1987

[54] OPTICAL FIBER CONNECTED BROADBAND MICROWAVE PACKAGE FOR OPTOELECTRONIC COMPONENTS

[75] Inventors: Vincent A. Lanzisera, Northboro; Robert A. Scalisi, Medford; Peter Oberhauser, Sudbury, all of Mass.

[73] Assignee: GTE Laboratories Incorporated, Waltham, Mass.

[21] Appl. No.: 564,124

[22] Filed: Dec. 21, 1983

[51] Int. Cl.[4] .................................................. G02B 6/36
[52] U.S. Cl. ................................................... 350/96.20
[58] Field of Search ........................... 350/96.20, 96.21

[56] References Cited

U.S. PATENT DOCUMENTS

| | | | |
|---|---|---|---|
| 4,118,105 | 10/1978 | Voigt | 350/96.20 |
| 4,119,363 | 10/1978 | Camlibel et al. | 350/96.20 |
| 4,285,572 | 8/1981 | Beaudette et al. | 350/96.20 |
| 4,316,204 | 2/1982 | Inagaki et al. | 350/96.20 |
| 4,362,360 | 12/1982 | Mannschke | 350/96.20 |
| 4,385,800 | 5/1983 | Basola et al. | 350/96.20 X |
| 4,477,146 | 10/1984 | Bonen et al. | 350/96.21 |
| 4,533,209 | 8/1985 | Segerson et al. | 350/96.20 |
| 4,553,814 | 11/1985 | Bahl et al. | 350/96.20 X |

FOREIGN PATENT DOCUMENTS

| | | | |
|---|---|---|---|
| 2488699 | 2/1982 | France | 350/96.20 |
| 0191613 | 11/1982 | Japan | 350/96.20 |

Primary Examiner—William L. Sikes
Attorney, Agent, or Firm—Fred Fisher

[57] ABSTRACT

Apparatus couples optical fiber to an optoelectronic component with a collet, a cylindrical member, a connector, and hermetically sealing means. The collet has a central orifice through a knurled end portion, a central portion with a male thread, and a second end portion formed with a slotted cone sleeve. The cylindrical member has opposed centrosymmetric recesses that meet, forming a small axially oriented aperture. One recess is formed with an axial female thread, with a conical indentation terminating at the aperture. The female thread can to engage with the collet male thread. Thread engagement of member and collet results in engagement of the member at the conical indentation with the coned sleeve, drawing the slotted sides inwardly, firmly gripping the collet held optical fiber. The other recess has a second axial female thread from the opposite end of the member toward the aperture. The member has a radially directed sight hole. The connector couples the optoelectronic component to an electronic circuit. Its peripheral surface has a second male thread to engage with the second female thread of the member. Orientation of the collet held fiber with respect to the optoelectronic component can be varied by adjusting the second threads, with observation through the sight hole.

8 Claims, 4 Drawing Figures

OPTICAL FIBER CONNECTED BROADBAND MICROWAVE PACKAGE FOR OPTOELECTRONIC COMPONENTS

BACKGROUND OF THE INVENTION

1. Field of the Invention

This invention relates to optical fiber connected broadband microwave packages for optoelectronic components and, in particular, to apparatus for coupling an optical fiber to an optoelectronic component. Accordingly, it is a general object of this invention to provide new and improved packages and apparatus of such character.

2. Description of the Prior Art

In the past, optoelectronic components, such as diode lasers, light emitting diodes, and photodetectors were usually placed in either metal transistor packages, ceramic to metal packages, or metal laboratory carriers. Optical fiber alignment, when included in the package, was accomplished by tedious micromanipulation and epoxing.

Disadvantageously, many existing packages of the prior art could not accept an optical fiber. Those that did, in general, required hours of tedious fiber alignment, utilizing micromanipulation and subsequent epoxing to make a permanent optical fiber connection. Such alignment of a fiber to a semiconductor was difficult for an operator. Furthermore, a period of time in excess of 24 hours was required for the epoxy to fully cure and to hold the optical fiber in a rigid position. Even with a duration in excess of 24 hours, the optical fiber could slightly shift from its original position as the epoxy cured, causing coupling efficiency to degrade appreciably. Such prior art packages could not be, conveniently, hermetically sealed.

Disadvantageously, existing packages required separate radio frequency mounts so that microwave and bias connections could be made. Due to discontinuities at the interfaces of such packages and mounts, electrical connections easily became intermittent. Very high reflections at microwave frequencies resulted, thereby degrading device performance.

SUMMARY OF THE INVENTION

Another object of this invention is to provide a new and improved optical fiber connected broadband microwave package for optoelectronic components that can be easily assembled and that can be easily hermetically sealed.

Still another object of this invention is to provide a new and improved apparatus for coupling an optical fiber to an optoelectronic component that does not require an external heat sink.

Yet another object of this invention is to provide a new and improved optical fiber connected broadband microwave package for an optoelectronic component in which the package can be assembled and disassembled readily so that an optical fiber can be quickly changed, thereby providing an advantageous package for use in a field environment where a package is be assembled or a failed package is to be replaced on site.

Still yet another object of this invention is to provide a new and improved optical fiber connected broadband microwave package having a broad bandwidth from direct current to approximately 25 GHz.

In accordance with one aspect of the invention, apparatus for coupling an optical fiber to an opto electronic component includes a collet chuck, a holding member, and a connector body. The collet chuck has a first end portion, a central portion, and a second end portion. The collet chuck is formed with a central orifice therethrough. The central portion is formed with a male thread; the second end portion is formed with an externally coned sleeve slotted along a plurality of sides thereof. The holding member has a first recess at one end and a second recess at a second end. The recesses engage at their juncture to form a small aperture. The member, at its first recess, is formed with a first female thread and is formed with a conical indentation terminating at the aperture. The first female thread is adapted to engage with the first male thread. Thus, engagement of the first threads of the member and the chuck results in engagement of the member at the conical indentation with the coned sleeve, drawing the slotted sides inwardly to firmly grip an optical fiber held by the chuck. The member, medially oriented with respect to the second recess, is formed with an outwardly directed sight hole. The connector body has a first end which is adapted to hold the optoelectronic component. The connector body has a second end which is adapted to be coupled to an electronic circuit. The external surface of the connector body is engageable with the second recess of the member. In accordance with certain features of the invention, the first end portion of the collet chuck can be formed to provide for the gripping of the end portion to facilitate rotation of the collet chuck. Such forming can be by knurling. The collet chuck can be integral and centrosymmetric. With certain features, the one end of the holding member and the second end of the holding member are oriented opposite to each other. The recesses are centrosymmetrically oriented with respect to the holding member, and the aperture is axially oriented. With other features, the connector body can have an external male thread, the member at its second recess has an internal female thread, and the external male thread and the internal female thread can be adapted to be mated with respect to each other. The apparatus can be adapted to be hermetically sealed.

In accordance with another aspect of the invention, apparatus for coupling an optical fiber to an optoelectronic component comprises an integral, centrosymmetric collet chuck, a cylindrical member, a generally cylindrical connector body, and means for hermetically sealing the apparatus. The integral centrosymmetric collet chuck has a first end portion, a central portion, and a second end portion. The collet chuck is formed with a central orifice therethrough. The first end portion is formed with knurling. The central portion is formed with a first male thread; the second end portion is formed with an externally coned sleeve slotted along a plurality of sides thereof. The cylindrical member has a first centrosymmetric recess at one end thereof and a second centrosymmetric recess at an opposite end thereof. The recesses engage at their juncture to form a small axially oriented aperture. The member, at the first recess, is formed with a first axially oriented female thread and is formed with a conical indentation terminating at the aperture. The first female thread is adapted to engage with the first male thread. Thus, engagement of the first threads of the member and the chuck results in the engagement of the member at the conical indentation with the coned sleeve, drawing the slotted sides inwardly to firmly grip an optical fiber held by the chuck. The member, at the second recess, is formed with a second axial female thread from the opposite end thereof toward the aperture. The member, medially oriented with respect to the second recess, is formed with a radially directed sight hole. The generally cylindrical connector body has a first end formed to hold the optoelectronic component. The body has a second end which is adapted to be coupled to an electronic circuit. The external peripheral surface of the body is formed with a second male thread. The second male thread of such connector body is adapted to engage with the second female thread of the member. Thus, orientation of an optical fiber held by the chuck with respect to the opto electronic component held by the connector body can be varied by adjustment of the second male threads with respect to each other and can be observed by viewing the orientation through the sight hole. The overall apparatus is then hermetically sealed by suitable means.

BRIEF DESCRIPTION OF THE DRAWING

Other objects, advantages and features of this invention, together with its construction and mode of operation, will be apparent from the following description, when read in conjunction with the accompanying drawings, in which.

DESCRIPTION OF PREFERRED EMBODIMENTS

Figure 1A:
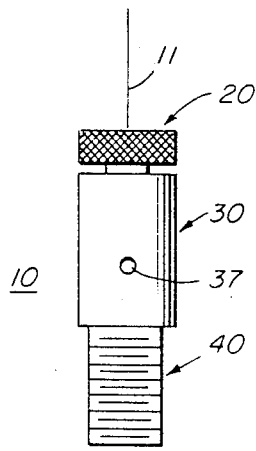
FIG. 1(A) is a front view of assembled apparatus in accordance with one embodiment of the invention.
Figure 1B:
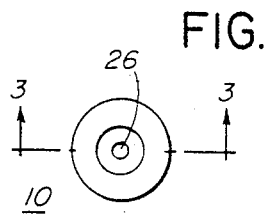
FIG. 1(B) is a top view of the apparatus depicted in FIG. 1(A)
Figure 2:
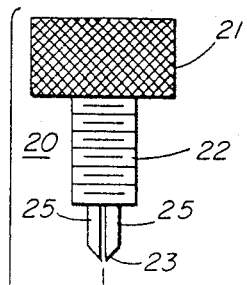
FIG. 2 is an enlarged, exploded view of the apparatus depicted in FIG. 1(A)
Figure 2:
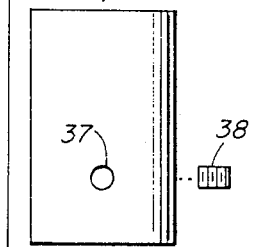
Figure 3:
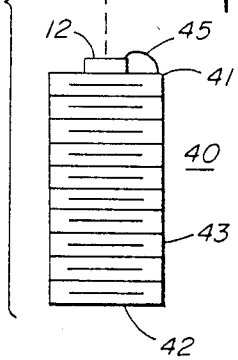
FIG. 3 is an enlarged, exploded, sectional view of the apparatus depicted in FIG. 1(B), taken along the line 3—3 thereof.

Referring to FIG. 1(A) an assembled optical fiber connected broadband microwave package 10 is suitable apparatus for coupling an optical fiber 11 to an opto electronic component 12 (see FIGS. 2 and 3).

The assembled package 10 includes three principal elements: a locking collet 20, a holding member 30, and a connector body 40. The collet 20, or collet chuck, has a first end portion 21 which is so formed to provide convenient gripping for facilitating rotation thereof. As depicted in FIG. 2, the first end portion 21 is formed with knurling so that it can be easily manually gripped. The collet chuck 20 further includes a central portion 22 which is formed with a male thread. The collet chuck 20 is further formed with a second end portion having an externally coned sleeve 23, slotted as at 24 along a plurality of sides 25—25 of the coned sleeve 23.

Preferably, the collet chuck 20 is formed of unitary conductive material and is centrosymmetric in that the first end portion 21, the central portion 22, and the second end portion including the cone sleeve 23 are aligned with a central orifice 26 therethrough.

The holding member 30 has a first recess 31 at one end (at the top as viewed in FIG. 3) and a second recess 32 at a second end thereof. The recesses 31, 32 engage at their juncture to form a small aperture 33.

In a preferred mode, as depicted in FIG. 3, the two ends of the holding member 30 are oriented opposite to each other, and the recesses 31 and 32 are centrosymmetrically oriented with respect to the holding member 30, whereby the aperture 33 is axially oriented. The holding member 30, in a preferred mode, is a cylindrical unit in which the recesses 31, 32 are centrosymmetric and the aperture 33 is axially oriented. The member 30, at the first recess 31, is formed with a first axially oriented female thread 34 and is formed with a conical indentation 35 terminating at the aperture 33. The first female thread 34 is adapted to engage with the first (and only) male thread 22 of the collet chuck 20.

Thus, engagement of the first threads 22 and 34 of the chuck 20 and the member 30 results in the engagement of the coned sleeve 23 with the conical indentation 35 of the member 30, drawing the slotted sides 25 inwardly to firmly grip the optical fiber 11 held by the chuck 20.

The cylindrical member 30, at the second recess 32, is formed with a second axial female thread 36 from the opposite end of the member 30 toward the aperture 33.

The holding member 30, medially oriented with respect to the second recess 32, is provided with a radially directed sight hole 37.

A generally cylindrical connector body, such as an SMA connector 40, has a first end 41 formed to hold the optoelectronic component 12. The opposite end 42 is adapted to be coupled to an electronic circuit, as for example by way of a coaxial connector, not shown.

The external peripheral surface of the connector 40 is formed with a single male thread 43 (hereinafter referred to as second male thread, to distinguish over the first male thread 22 of the collet chuck 20) which is adapted to engage with the second female thread 36 of the holding member 30.

Thus, orientation of an optical fiber 11 held by the collet chuck 20 with respect to the optoelectronic component 12 held by the connector body 40 can be varied by adjustment of the second male thread 43 with respect to the second female thread 36 and can observed by viewing such orientation through the sight hole 37. The sight hole can be filled with an appropriate set screw 38; the overall package 10 can be hermetically sealed to prevent the entrance of dust and the like.

The set screw 38 is placed into the viewing hole 37 of the threaded hole 30, thereby closing the holder 30 and securing the connector 40. The package 10 is highly precise. The optical fiber 11 is concentric in the package because of its precision and is also easily locked.

As indicated in FIG. 3, the optoelectronic component 12, such as a diode, is centered and can be epoxy bonded or indium soldered to the center conductor 44 of the SMA connector 40. A wire 45 is bonded from the optoelectronic component 12 to the outer conductor 46 to maintain DC bias and provide electrical continuity. The optical fiber 11, with coating and exposed cleaved fiber (approximately 3/32" in length), is placed through the locking collet 20. The locking collet 20 is turned into the top of a threaded holder 30, thereby locking and precisely centering the fiber 11. The SMA connector 40 with the optoelectronic component 12 is turned into the bottom of the threaded holder 30. The sight hole 37 on the side of the holder 30 is provided to view, with a simple microscope (not shown), the distance between the fiber 11 and the optoelectronic component 12. Once the distance between the fiber 11 and the optoelectronic component 12 has been determined, a set screw 38 is placed into the viewing hole 37 to close the hole and also to lock the SMA connector 40 that holds the component 12. The distance between the optical fiber 11 and the optoelectronic component 12 is settable either by positioning the optoelectronic component 12 or by positioning the optical fiber 11. In either case, one or the other is locked first. The package 10 can directly mate with a type SMA coaxial system.

A feature of this invention is that it provides direct continuity to an RF coaxial system having no discontinuities due to a separate package.

The optical fiber connected broadband microwave package 10 is rugged and is well suited for telephone communications, satellite and space craft links, space laboratories, underwater terminals, robots, aircraft, automobiles, naval vessels and any unit, craft or vehicle that requires communications.

An optical fiber connected broadband microwave package 10 for optoelectronic components, as depicted in FIGS. 1(A), 1(B), 2 and 3, has been constructed. An optoelectronic component 12 was affixed to an SMA connector 40. After cleaving a fiber 11 to insert into the package 10, approximately 40 seconds was expended to position the fiber 11, lock it in place and turn the connector 40 into the holder 30. The alignment was considered excellent and the fiber 11 was perfectly centered within a few mils from the optoelectronic component 12.

Because the optical fiber broadband microwave package 10 utilizes components which are made of, preferably, beryllium copper, it does not require an external heat sink. Optical fibers can be changed readily, a feature that is very advantageous in a field environment.

Another feature is that the SMA connector is also the mount for the optoelectronic component 12, eliminating the need for a separate mount. Because it is a mount, the size of the connector is comparable to other similar connectors that require separate mounts. Its bandwidth is direct current to approximately 25 GHz.

A threaded screw-on cap (not shown) can contain a window, a neutral density filter, or an epoxy optical fiber. The distance of the window, neutral density filter, or optical fiber from the bonded component 12 can be easily changed by rotating the threaded cap about the connector 10. The threaded screw-on cap (not shown) can be easily sealed, after adjustment, when performed in the field.

In an alternative embodiment, the package 10 can be created in a less precise fashion utilizing a locking collet 20, a holder 30, an SMA connector 40 with the optoelectronic component 12, and a locking cap (not shown) for engaging the coned sleeve 23 of the locking collet 20. Such an additional locking cap is not preferred, both because an additional part is utilized and because the package is not as precise as the embodiment depicted in FIGS. 1(A), 1(B), 2 and 3.

In lieu of an SMA connector, a smaller version of the package can be produced by reducing the size of the connector to an OSSM standard, thereby increasing the electrical bandwidth of the package 10.

Figure 4:
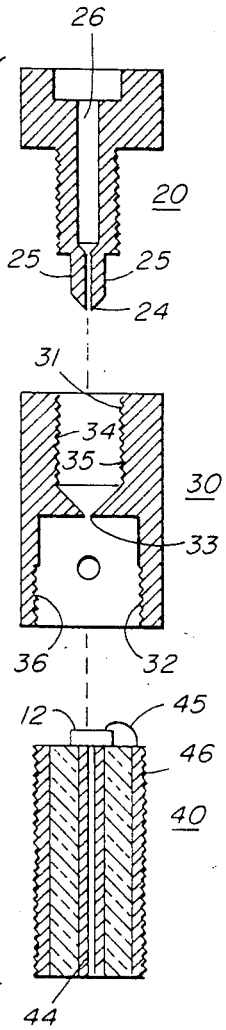
FIG. 4 is a view, partly broken away, of another embodiment of the invention.
Figure 4:
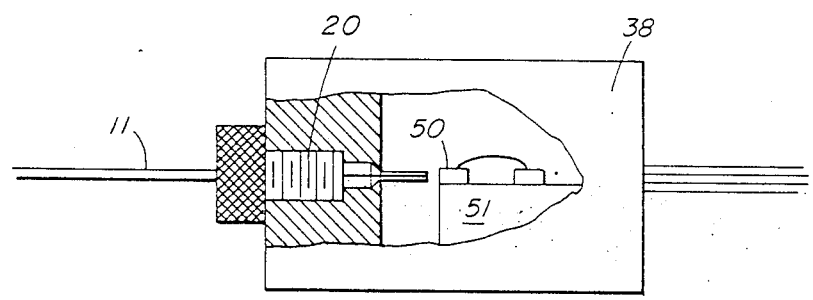

Yet another alternative embodiment is depicted in FIG. 4 in which an optical fiber locking collet 20 is used for aligning a fiber 11 to a diode laser 50 in a diode laser package 51, the collet 20 and the diode laser package 51 being both held within an external housing 38.

Advantageously, the package 10 described herein can be simply assembled and can be easily hermetically sealed. It requires approximately one minute for an operator to assemble a package in accordance with this invention and to align the optical fiber.

What is claimed is:

1. Apparatus for coupling an optical fiber to an optoelectronic component comprising
    (a) a collet chuck having a first end portion, a central portion, and a second end portion, said collet chuck being formed with a central orifice therethrough,
        said central portion being formed with a first male thread, and
        said second end portion being formed with an externally coned sleeve, slotted along a plurality of sides thereof;
    (b) a holding member having a first recess at one end thereof and a second recess at a second end thereof, said recesses engaging at their juncture to form a small aperture,
        said member, at said first recess, being formed with a first female thread, and being formed with a conical indentation terminating at said aperture, said first female thread being adapted to engage with said first male thread,
        whereby engagement of said first threads of said member and said chuck results in the engagement of said member, at said conical indentation, with said coned sleeve, drawing the slotted sides inwardly to firmly grip an optical fiber held by said chuck,
        said member, medially oriented with respect to said second recess, being formed with an outwardly directed sight hole; and
    (c) a connector body having a first end, a second end, and an external surface,
        said first end adapted to hold said optoelectronic component,
        said second end being adapted to be coupled to an electronic circuit, and
        said external surface being engageable within said second recess of said member.

2. The apparatus as recited in claim 1 wherein said first end portion of said collet chuck is so formed to provide for the gripping of said end portion to facilitate rotation of said collet chuck.

3. The apparatus as recited in claim 2 wherein said first end portion of said collet chuck is formed with knurling.

4. The apparatus as recited in claim 1 wherein said collet chuck is integral and centrosymmetric.

5. The apparatus as recited in claim 1 wherein said one end of said holding member and said second end of said holding member are oriented opposite to each other, said recesses are centrosymmetrically oriented with respect to said holding member, and said aperture is axially oriented.

6. The apparatus as recited in claim 1 wherein said connector body has an external male thread, said member at said second recess has an internal female thread, and wherein said external male thread and said internal female thread are adapted to be mated.

7. The apparatus as recited in claim 1 wherein said apparatus is adapted to be hermetically sealed.

8. Apparatus for coupling an optical fiber to an optoelectronic component comprising
    (a) an integral, centrosymmetric collet chuck having a first end portion, a central portion, and a second end portion, said collet chuck being formed with a central orifice therethrough,
        said first end portion being formed with knurling,
        said central portion being formed with a first male thread, and said second end portion being formed with an externally coned sleeve, slotted along a plurality of sides thereof;

(b) a cylindrical member having a first centrosymmetric recess at one end thereof and a second centrosymmetric recess at an opposite end thereof, said recesses engaging at their juncture to form a small, axially oriented aperture, said member, at said first recess, being formed with a first axially oriented female thread, and being formed with a conical indentation terminating at said aperture, said first female thread being adapted to engage with said first male thread, whereby engagement of said first threads of said member and said chuck results in the engagement of said member, at said conical indentation, with said coned sleeve, drawing the slotted sides inwardly to firmly grip an optical fiber held by said chuck, said member, at said second recess being formed with a second axial female thread from said opposite end thereof toward said aperture, said member, medially oriented with respect to said second recess, being formed with a radially directed sight hole;

(c) a generally cylindrical connector body having a first end, a second end, and an external peripheral surface, said first end being formed to hold said optoelectronic component, said second end being adapted to be coupled to an electronic circuit, and said external peripheral surface being formed with a second male thread, said second male thread of said connector body being adapted to engage with said second female thread of said member, whereby orientation of an optical fiber held by said chuck with respect to said optoelectronic component held by said connector body can be varied by adjustment of said second threads with respect to each other and can be observed by viewing said orientation through said sight hole; and (d) means for hermetically sealing said apparatus.

* * * * *